United States Patent
Merli et al.

[19]

[11] Patent Number: 6,088,141
[45] Date of Patent: Jul. 11, 2000

[54] SELF-HEALING NETWORK

[75] Inventors: Stefano Merli, Rome; Francesco Testa, Pomezia; Renato Norbiato, Anzio; Paolo Andreozzi, Rome, all of Italy

[73] Assignee: Telefonaktiebolaget LM Ericsson, Stockholm, Sweden

[21] Appl. No.: 08/981,782
[22] PCT Filed: Jun. 18, 1996
[86] PCT No.: PCT/SE96/00794
 § 371 Date: May 27, 1998
 § 102(e) Date: May 27, 1998
[87] PCT Pub. No.: WO97/01907
 PCT Pub. Date: Jan. 16, 1997

[30] Foreign Application Priority Data

Jun. 26, 1995 [SE] Sweden .................................. 9502310
Oct. 12, 1995 [SE] Sweden .................................. 9503573

[51] Int. Cl.[7] ............................ H04B 10/08; H04J 14/00; H04J 14/02; G01R 31/08
[52] U.S. Cl. ......................... 359/110; 359/110; 359/117; 359/128; 359/166; 370/222; 370/223
[58] Field of Search .................................. 359/110, 117, 359/128, 166, 123, 125, 119; 370/222, 223

[56] References Cited

U.S. PATENT DOCUMENTS

| | | | |
|---|---|---|---|
| 4,829,512 | 5/1989 | Nakai et al. | 370/16 |
| 5,081,452 | 1/1992 | Cozic | 340/825.5 |
| 5,159,595 | 10/1992 | Flanagan et al. | 370/85.15 |
| 5,457,556 | 10/1995 | Shiragaki | 359/117 |
| 5,680,235 | 10/1997 | Johansson | 359/110 |

FOREIGN PATENT DOCUMENTS

| | | |
|---|---|---|
| 2 617 354 | 12/1988 | France . |
| 93/00756 | 1/1993 | WIPO . |

OTHER PUBLICATIONS

A. Elrefaie, "Self–Healing Ring Network Architecture Using WDM for Growth," ECOC 92, Tu P1.16.

*Primary Examiner*—Jason Chan
*Assistant Examiner*—Mohammad Sedighian
*Attorney, Agent, or Firm*—Burns, Doane, Swecker & Mathis, L.L.P.

[57] ABSTRACT

A communication network system having at least three nodes, which are interconnected by transmission links carrying traffic to and from the nodes. The transmission links are divided into a working ring and a protection ring where the working ring and the protection ring can transmit traffic in opposite directions. A node is able to detect when an error occurs in the surrounding transmission links or the node itself. Each node can, by itself, divert traffic from the working ring to the protection ring and/or from the protection ring to the working ring. A recovery action is performed when the error is healed.

18 Claims, 9 Drawing Sheets

SELF-HEALING NETWORK

TECHNICAL FIELD FOR THE INVENTION

The present invention relates to an apparatus and a method for a communication network, more particular to a self-healing network.

DESCRIPTION OF RELATED ART

In a conventional self-healing ring architecture, synchronous digital hierarchy SDH or synchronous optical network SONET, utilizing add/drop multiplexer (ADM), the optical fiber is only used as point to point link and optical-electrical conversion is operated at each node. In such a ring the bottleneck is constituted by the speed of the processing electronics, and the bandwidth-sharing is characteristic for this architecture leads to a limitation of the network capacity.

In the article "Self-Healing Ring Network Architecture Using WDM for Growth", ECOC 92, Tu P1.16, by Aly Elrefaie, is presented a self-healing ring network. It is described by a 2-fiber WDM ring network where N-1 local offices are originating traffic that is served by a single hub. Transmission on both fiber rings is identical except for the direction of propagation; the counter propagating signals facilitate the network survivability during a cable cut. Each of the N-1 local offices is assigned a unique wavelength for transmission to and receiving from the hub.

In the PCT-application WO 93/00756, by Sandesara is described a self-healing bidirectional logical-ring network using crossconnects nodes. The network is partitioned into independent segments. Each segment consists of two or more nodes, interconnected with two transmission links working in different directions. When a failure occurs a crossconnect maintains a pre-selected pattern of interconnections between segments.

In the above PCT-application WO 93/00756 is described a unidirectional self-healing network. In addition to the transmission link there is also a spare link. The transmitted signal is duplicated and flows in both said links at the same time. The destination node then selects the better of the two signals. It is also stated that the signal structure in previous known uni- and bidirectional networks consists of a predetermined number of subrate multiplexed channels operating at fixed rate.

SUMMARY

This invention pays attention to the problem that it takes long time between detecting a fault and re-routing the traffic in a communication network, in particular a self-healing ring network. This invention also addresses the problem that a tremendous amount of traffic and data might become lost when an error occurs and the traffic has to be re-routed in the communication network.

According to this invention, a communication node in a communication network can detect the fault easily and quickly, in that the detection takes place in the node itself. Furthermore, the node is able to detect a fault in the network that occurs in the immediate surrounding of this node. Upon detection of a fault the node is capable of swiftly re-routing any traffic and will, additionally, go from an active working state into a protection state. After error identification the node will self-heal, recuperate, and automatically go back into the working state The purpose of the invention is to get a self-healing network in which the nodes are rapidly self-healing.

A further purpose is that the nodes need no network management for the healing.

An advantage is that the node can add/drop any of the wavelengths for the local traffic and by-pass others.

Another advantage is that if a cable is cut or broken all traffic can swiftly be re-routed by the node itself, restoration takes place within the node local control system, without involving network management.

Yet another advantage is that this invention shortens the time needed for the network to recover.

Further advantage is that network restoration is fast in order to provide high quality service.

The invention will be presented with the help of the best mode carrying out the invention characterized by the characterizing features set forth in the appended claims.

DETAILED DESCRIPTION OF EMBODIMENTS

Figure 1A:
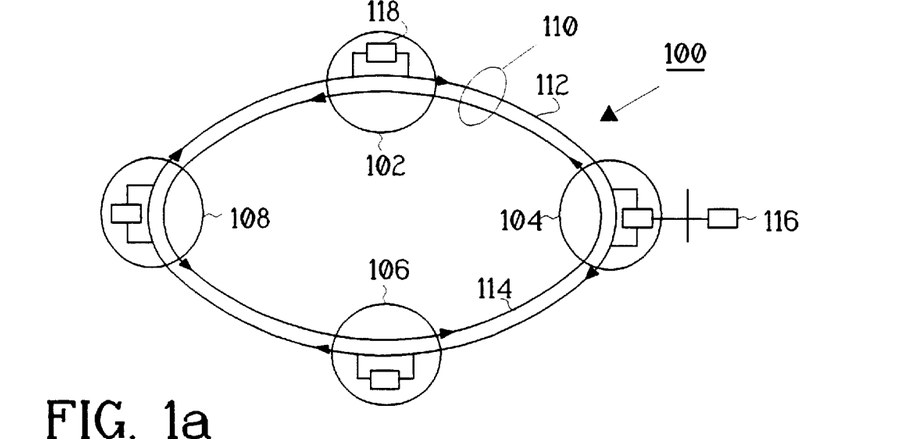
FIG. 1a shows a communication network system.

FIG. 1a shows a schematic view of a communication ring network 100 where the present invention may be implemented. The network 100 has a number of N nodes 102–108 connected to each other by transmission links e.g. optical links 110. N stands for at least three, meaning that the network 100 consists of at least three nodes. The transmission links 110 comprise; a first transmission link or working ring 112, and a second transmission link or a protection ring 114. The working ring 112 is carrying traffic in one transmission direction, clockwise in the figure. The protection ring 114 is carrying traffic in the opposite transmission direction, counter-clockwise in the figure. The traffic can, for example be electric, optical energy or wavelength channels. If wavelength channels are used, there are M optical channels transmitted where M can be less, equal or more than N nodes. FIG. 1a also shows the communication network 100 in its normal working state, where the M optical channels are transmitted in one direction through the working ring 112 together with optical amplifier spontaneous emission (ASE). In the protection ring 114 it is only the ASE power that propagates, in the opposite direction to the working ring 112. This communication network 100 could be a wavelength division multiplexed self-healing ring communication network 100, as in FIG. 1a. Other types of networks are, for example wavelength division multiplexing (WDM) networks which are not shown here, could also be used as the communication network system. Each node 102–108 in the communication network 100 can consist of an optical add/drop multiplexer 118, OADM, which is able to add/drop wavelength channels or traffic dedicated to the node, i.e. local traffic, and by-pass others. Some wavelength channels can be dedicated to a node, other wavelength channels will be passed by and go to the next node in the working ring 112.

Figure 1B:
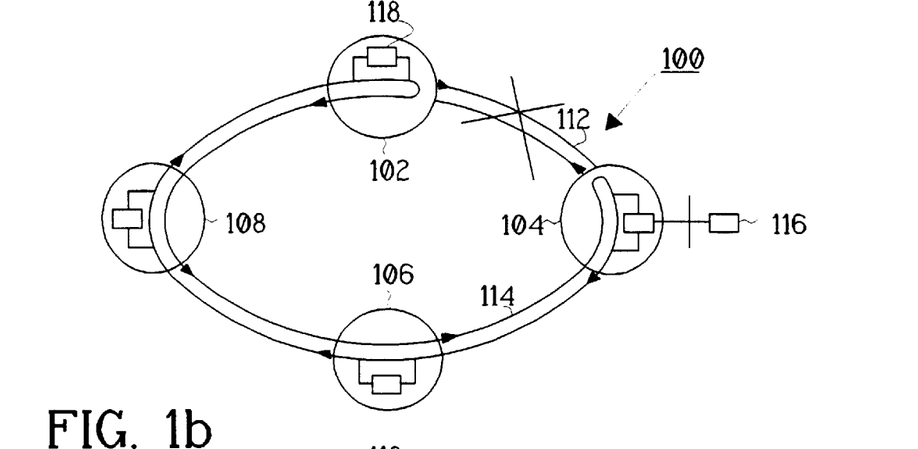
FIG. 1b shows a communication network system with links cut.

FIG. 1*b* shows the communication network 100 with link error, e.g. a cable cut, between node 102 and node 104. Protection actions have taken place within the nodes 102 and 104 themselves, without involving a network management system 116, which is merely informed of failure events. The protection actions are accomplished by the node, using electronics in a combination of signal on/off in the node itself at the working/protection rings 112, 114. The node 102 detects by itself when a link error, e.g. a cable cut occurs and it will by itself automatically divert the traffic on working ring 112 towards the protection ring 114. All traffic leaving the node 102 will then go back into the protection ring 114 and a tail node arises. The node 104 also detects itself when a link error, e.g. a cable cut occurs and it will by itself automatically divert traffic from the protection ring 114 towards the working ring 112. All traffic leaving the node 104 will then go back into the working ring 112 and a head node arises. The nodes 106 and 108 will act as transit nodes which means that wavelength channels that normally are transmitted only on the working ring 112 also are transmitted on the protection ring 114, but just pass by the nodes 106 and 108 without any adding/dropping of any wavelength channels. When the transmitted wavelength channels return back to the node on the working ring 112 adding/dropping channels are working as normal at each node.

There are actually at least two types of link errors, e.g. cable cuts; one is when the error, e.g. cable cut occurs only in the working ring 112, and the other is when the error, e.g. cable cut occurs only in the protection ring 114. When the error occurs on the working ring 112, the first node 104 after the error in the traffic direction clockwise will automatically by itself change its mode of operation to a head node. The last node 102 before the error in the traffic direction clockwise will automatically by itself change its mode of operation to a tail node. In the second case, when an error, e.g. a cable cut occurs in the protection ring 114, the last node 102 before the error in the traffic direction will automatically by itself change its mode of operation to a tail node and the first node 104 after the error in the traffic direction will automatically by itself change its mode of operation to a head node.

Figure 1C:
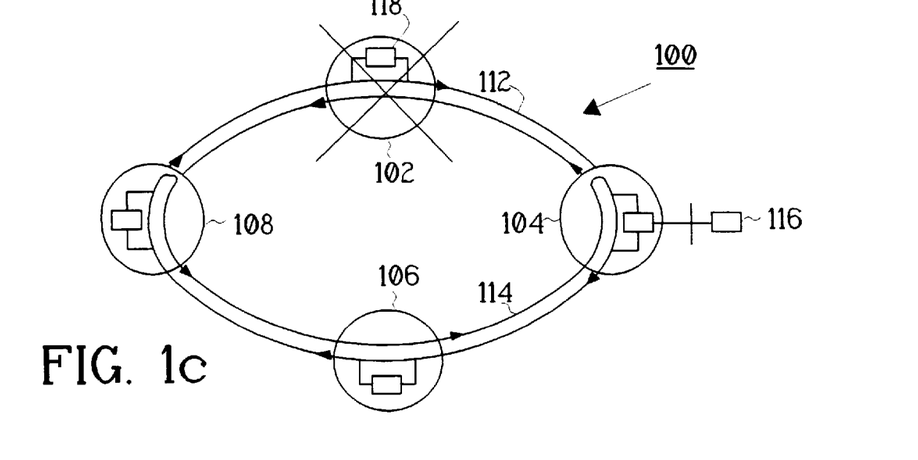
FIG. 1c shows a communication network system with node failure.

FIG. 1*c* shows the communication network 100 with a node failure. The same kind of re-configuration, i.e. change of mode of operation will occur as in FIG. 1*b*, so that one head node, the node 104, and one tail node, the node 108, will be established. Also in this case there is a transit node 106 in between the head node 104 and the tail node 108.

Figure 2:
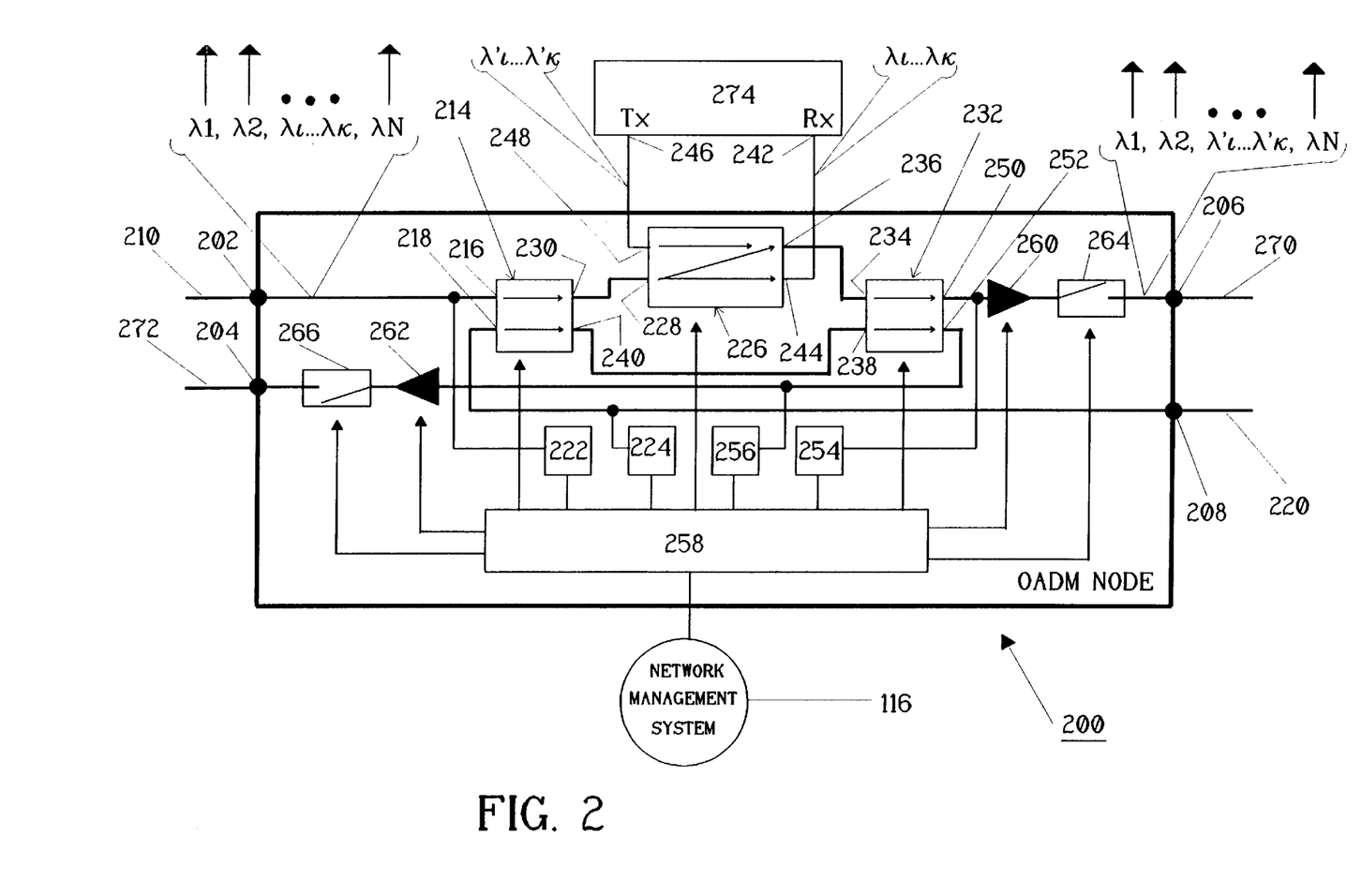
FIG. 2 shows a detailed node structure.

FIG. 2 shows a block diagram of an optical add/drop multiplexer node 200 according to the invention, which node can be any of the nodes 102–108 in FIG. 1. The node 200 has a working ring input 202, which is connected to a first light propagating means, e.g. first incoming optical link 210 which could be an optical fiber. The working ring input 202 is connected to a first optical input 216 of an optical switching means, e.g. first optical switch 214, which can be switched for working in either bar or cross states. A second light propagation means, e.g second incoming optical link 220 which could be an optical fiber, is connected to a protection ring input 208 of the node 200. This protection ring input 208 is connected to a second optical input 218 of the first optical switch 214. A first optical output 230 of the first optical switch 214, which in bar state is coupled to the first optical input 216, is connected to a first optical input 228 of an optical channel selective switch or wavelength selective switch 226, which also works in either bar or cross state. The first optical input 228 of the channel selective switch 226 is coupled to a first optical output 244 of said channel selective switch 226 in bar state. This first optical output 244 is optically connected to an input 242 on a line terminal 274, which is associated with the node. An output 246 on the line terminal 274 is optically connected to a second input 248 of the channel selective switch 226. This second input 248 is in bar state connected to a second optical output 236 of said channel selective switch 226, which second optical output 236 is optically connected to a first input 234 of an optical switching means e.g. a second optical switch 232. The second optical switch 232 can operate in bar and cross states. A second input 238 of the second optical switch 232 is connected to a second output 240 of the first optical switch 214, which second output 240 is coupled to the second input 218 in bar state.

A first output 250 of the second optical switch 232, which in bar state is coupled to the first input 234, is connected to an optical amplifier 260, which in turn is connected to a first optical breaking switch 264. This switch 264 is connected to a working ring output 206 in the node 200. The working ring output 206 is connected to a third light propagating means 270. A second output 252 of the second optical switch 232, which in bar state is coupled to the second input 238, is connected to a second optical amplifier 262, which in turn is connected to a second optical breaking switch 266. The second breaking switch 266 is connected to a protection ring output 204 in the node 200, which is connected to a fourth light propagating means 272.

A first incoming link supervision means, e.g. a first fault monitor 222 is optically connected to the first input 216 of the first optical switch 214. A second incoming link supervision means, e.g. a second fault monitor 224 is optically coupled to the second input 218 of the first optical switch 214. A first power detection monitor 254 is optically coupled to the first output 250 of the second optical switch 232, and a second power detection monitor 256 is optically coupled to the second output 252 of the second optical switch 232. The fault monitors 222 and 224, the amplifiers 260 and 262, as well as the power detection monitors 254 and 256 are electrically connected to a control means or local control unit 258. The unit 258 controls the first and second optical switches 214 and 232, the wavelength selective switch 226, and the first and second breaking switches 264 and 266. The local control unit 258 is connected to a network management means, the so called network management system 116, which is located outside the node 200. The network management system is connected correspondingly to other nodes as well.

The first light propagating means 210 connected to the working ring input 202 of the optical add/drop multiplexer node 200 forms with the third light propagation means 270, connected to the working ring output 206, a part of the working ring 112, c.f. FIG. 1. In FIG. 2 the second light propagating means 222 connected to the protection ring input 208 of the optical add/drop multiplexer node 200 forms with the fourth light propagation means 272, connected to the protection ring output 204, a part of the protection ring 114, c.f. FIG. 1*b*.

When the optical add/drop multiplexer node 200 is in normal working state (FIG. 1*a*) the number of M wavelength channels come into the node 200 from the working ring input 202 and they reach the wavelength selective switch 226 after being passed through the first optical switch 214 which is in bar state. The wavelength selective switch 226 performs the wavelength channels adding/dropping, i.e. the local traffic, and the wavelength channels that by-pass the node 200. The wavelength selective switch 226 selects and drops the wavelength channels dedicated to the node 200, towards the line terminal 274 at its input 242 (Rx). The line terminal 274 comprises an optical receiver connected to the input 242 via a filtering device, and a transmitter connected to the output 246. The line terminal 274 further comprises means for demodulating the modulated light (not shown) and means for converting the modulation to electrical signals (not shown), and, furthermore, means for conveying these electrical signals to dedicated receivers via electrical outputs. The line terminal 274 also receives, via electrical input, electrical signals containing information, which signals are to be sent to a receiver through the network 100. The electrical signals are converted to modulation of light with selected wavelength, which is sent to the transmitter for adding to the network 100. The network management system 116 communicates with the local control unit 258, via a standard interface. The local control unit 258 thereafter controls the wavelength selective switch 226 to obtain the requested selection. The wavelength selective switch 226 adds new local traffic, coming from the line terminal 274 at the output 246 (Tx). The network management system 116 can order which wavelength channels shall be added to the working ring 112. The wavelength selective switch 226 by-passes and equalizes all the wavelength channels not dedicated to the node. The adding wavelength channels and by-passing wavelength channels coming from the wavelength selective switch 226 pass through the second optical switch 232 in bar state, through the optical amplifier 260 (for example an Erbium-doped fiber amplifier, EDFA) to be amplified and through the optical breaking switch 264 to be put into the working ring output 206 to reach the following OADM node. As shown in FIG. 2 the protection ring input 208 is connected to the protection ring output 204, which is obtained by the two optical switches 214 and 232 both being in bar states. This also allows for any optical power coming into the node protection ring input 208 to be simply amplified by the second optical amplifier 262, and transferred to the protection ring output 204.

The wavelength channels coming into the optical add/drop multiplexer node 200 can have different power levels, and in order to avoid unbalanced channel power through the network 100 a power equalization of wavelength channels is needed in each node 200. In order to accomplish such a function an amount of outgoing optical power is dropped by the power detection monitor 254, which measures the optical power levels. The optical power levels are sent to the local control unit 258, which calculates attenuation values for each wavelength channel, in order to obtain the equalization. The local control unit 258 sends the attenuation values to the wavelength selective switch 226 that selectively applies them to the respective channels.

This invention relates to a network fault recovery by nodes when a link fails between two nodes, for example between the nodes 102 and 104, see FIG. 1b.

A first fault event could be when both the working ring 112 and the protection ring 114 fails. The communication network 110 will then reconfigure with the help of the nodes 102 and 104 fail by themselves changing over to the head node mode, FIG. 1b, and the tail node mode, respectively.

In order to discover an error, e.g. break, of the first transmission link or working ring 112 the optical add/drop multiplexer node 200 in FIG. 2 is equipped with the first fault monitor 222, which taps a small amount of the incoming optical power from the working ring input 202. This could be the wavelength channels and/or the ASE power. The local control unit 258 gets information from the first fault monitor 222, and if there is any optical power the first fault monitor 222 stays in its working state. If the working ring 112 has failed and there is no optical power on the first fault monitor 222 it changes traffic over to protection state. The ASE power can still be present in the protection ring 114. Any detection of the traffic loss by the first fault monitor 222 initiates reconfiguration of the node 200 by the local control unit 258. The first fault monitor 222 or the local control unit 258 is put into protection state. After knowledge of fault detection by the first fault monitor 222 the local control unit 258 switches the first optical switch 214 over from bar state to cross state. The first optical switch 214 in cross state means that the second optical input 218 of the first optical switch 214 and the first optical output 230 of the first optical switch 214 are connected to each other. This means that the ASE power and/or traffic on the protection ring 114 is diverted over to the working ring 112. The local control unit 258 will also open the second breaking switch 266, so that neither traffic nor ASE power can be supplied to the protection ring output 204 after change-over. The node 200 has now entered a head node mode as in FIG. 1b. The local control unit 258 communicates with the network management system 116 and informs that the node 104 has become a head node.

A process to recover a head node from protection state to working state is initiated by the network management system 116, which communicates with the local control unit 258. In order to recover from the head node, the local control unit 258 closes the second breaking switch 266, and turns on the second optical amplifier 262 so that optical power can reach the preceding node in traffic diversion (the tail node) if the link is fault free, e.g. the optical fiber is unbroken. The local control unit 258 checks whether the first fault monitor 222 senses any optical power from the working ring input 202. This power could be the wavelength channels and/or the ASE power. If the first fault monitor 222 detects optical power the node will go into working state. The first fault monitor 222 or the local control unit 258 is put into working state. The local control unit 258 switches the first optical switch 214 from cross state to bar state so that traffic can be received from the working ring input 202. The traffic can now go through the working ring input 202 to the working ring output 206, which means that the traffic on the working ring 112 is back. ASE power from the protection ring input 204 to protection ring output 208. The local control unit 258 informs the network management system 116 that the node 104 has gone back to the working state. If the first fault monitor 222 does not detect any optical power it will stay in its protection state. After a certain time, for example 500 ms, the local control unit 258 turns off the second optical amplifier 262, opens the second breaking switch 266, and the recovery procedure is canceled. The local control unit 258 informs the network management system 116 that the recovery of the node 104 has been canceled.

In order to discover an error, e.g. break of the second transmission link or protection ring 114 the optical add/drop multiplexer node 200 in FIG. 2 is equipped with the second fault monitor 224, which taps a small amount of the incoming optical power from the protection ring input 208. This could be the ASE power and/or the wavelength channels. The local control unit 258 gets information from the second fault monitor 224, and if there is any optical power the second fault monitor 224 stays in its working state. If the protection ring 114 has failed and there is no optical power on the second fault monitor 224 if changes traffic over to protection state. The ASE power can still be present in the working ring 112. Any detection of the loss of ASE power or traffic by the second fault monitor 224 initiates reconfiguration of the node 200 by the local control unit 258. The second fault monitor 224 or the local control unit 258 is put into protection state. After knowledge of fault detection by the second fault monitor 224 the local control unit 258 switches the second optical switch 232 over from bar state to cross state. The second optical switch 232 in cross state means that the first optical input 234 of the second optical switch 232 and the second optical output 252 of the second optical switch 232 are connected to each other. This means that the traffic on the working ring 112 is diverted over to the protection ring 114. The local control unit 258 will also open the first breaking switch 264 so that neither traffic nor ASE power can be supplied to the working ring output 206 after change-over. The node 200 has now entered a tail node mode as in FIG. 1b. The local control unit 258 communicates with the network management system and informs the network management system 116 that the node 102 has become a tail node.

A process to recover a tail node from protection state to working state is initiated by the network management system 116, which communicates with the local control unit 258. In order to recover from the tail node, the local control unit 258 closes the first breaking switch 264 and turns on the first optical amplifier 260 so that optical power can reach the succeeding node after traffic diversion (the head node), if the link is fault free, e.g. the optical fiber is unbroken. The local control unit 258 checks whether the second fault monitor 224 senses any optical power from the protection ring input 208. This power could be the wavelength channels and/or the ASE power. If the second fault monitor 224 detects optical power the node will go into working state. The second fault monitor 224 or the local control unit 258 is put into working state. The local control unit 258 switches the second optical switch 232 from cross state to bar state so that traffic can return to the working ring output 206. The traffic can now go through the working ring input 202 to the working ring output 206, which means that the traffic on the working ring 112 is back. ASE power from the protection ring input 208 to the protection ring output 204. The local control unit 258 informs the network management system 116 that the node 102 has returned to the working state. If the second fault monitor 224 does not detect any optical power it will stay in its protection state. After a certain time, for example 500 ms, the local control unit 258 turns off the first optical amplifier 260, opens the first breaking switch 264, and the recovery procedure is canceled. The local control unit 258 informs the network management system 116 that the recovery of the node 102 has been canceled.

Despite the link error between node 102 and the node 104 no traffic is lost. The traffic will go between head node 104 and tail node 102 in the communication network 100, they still detect optical energy, i.e. signals at both their fault monitors 222, 224 in FIG. 2, maintaining their normal configuration. This allows the network 100 to retain the normal functions for the working ring 112. The tail node 102 diverts all the wavelength channels from the working ring input 202 to the protection ring output 204. The head node 104 diverts all the wavelength channels from the protection ring input 208 to the working ring output 206. The traffic diversion by the tail node to the protection ring 114 reaches the head node, which divert back to working ring 112 and a loop is formed. There could be at least one node in between head and tail nodes, in this case working as transit nodes 106, 108. The transit nodes 106, 108 are just nodes that are not head or tail nodes. They can add/drop wavelength channels, by-pass wavelength channels on the working ring 112 and/or the protection ring 114.

Figure 3A:
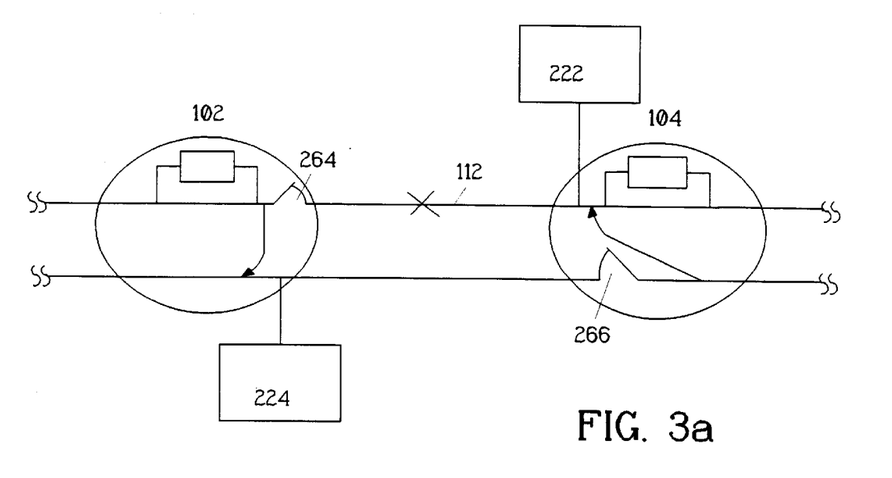
FIG. 3 shows a detailed head node, and a tail node.

In FIG. 3a, a second fault event could be when only the working ring 112 fails. If the working ring 112 is faulty, e.g. broken, the first fault monitor 222 detects the signal loss and starts the node 104 reconfiguration into the head node, see first fault event, which opens the second breaking switch 266. This causes the signal loss at the second fault monitor 224 of the previous node 102 which then starts the reconfiguration of the node 102 into tail node, see first fault event, which opens the first breaking switch 264.

Figure 3B:
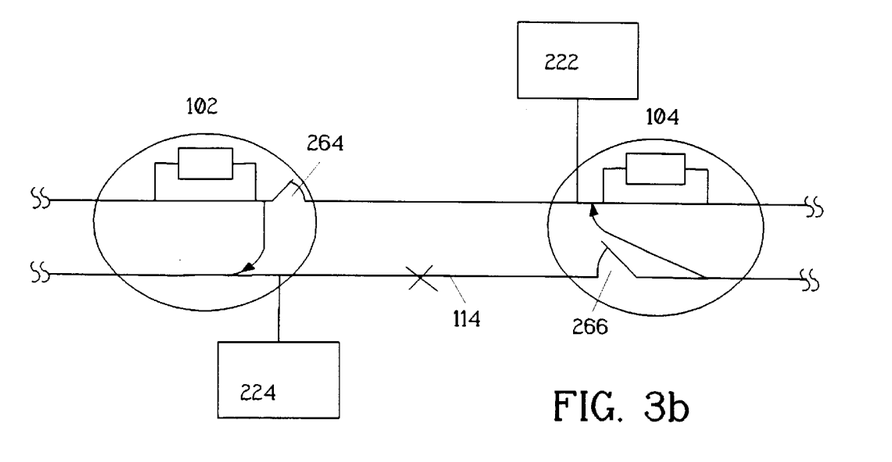

In FIG. 3b, a third fault event can be when only the protection ring 114 fails. If the protection ring 114 is faulty, e.g. broken, the individual node recovery actions would be the same but with an inverted order of sequence compared to the second fault event. This means that first the tail node and then the head node arises, obtaining the same node states and communication paths as the first fault event.

This invention also relates to a fault recovery when a node, e.g. 102 fails, FIG. 1c, with the same procedures as in the first fault event. The difference is that different nodes will become head node and tail node. In this fault event the node 104 will become the head node 104, see first fault event, and the node 108 will become the tail node 108, see first fault event. The faulty node 102 will be isolated from the others in FIG. 1c.

The process to recover any fault events described above is done in the same way as to recover the head node from protection state, and recover the tail node from protection state.

Figure 4:
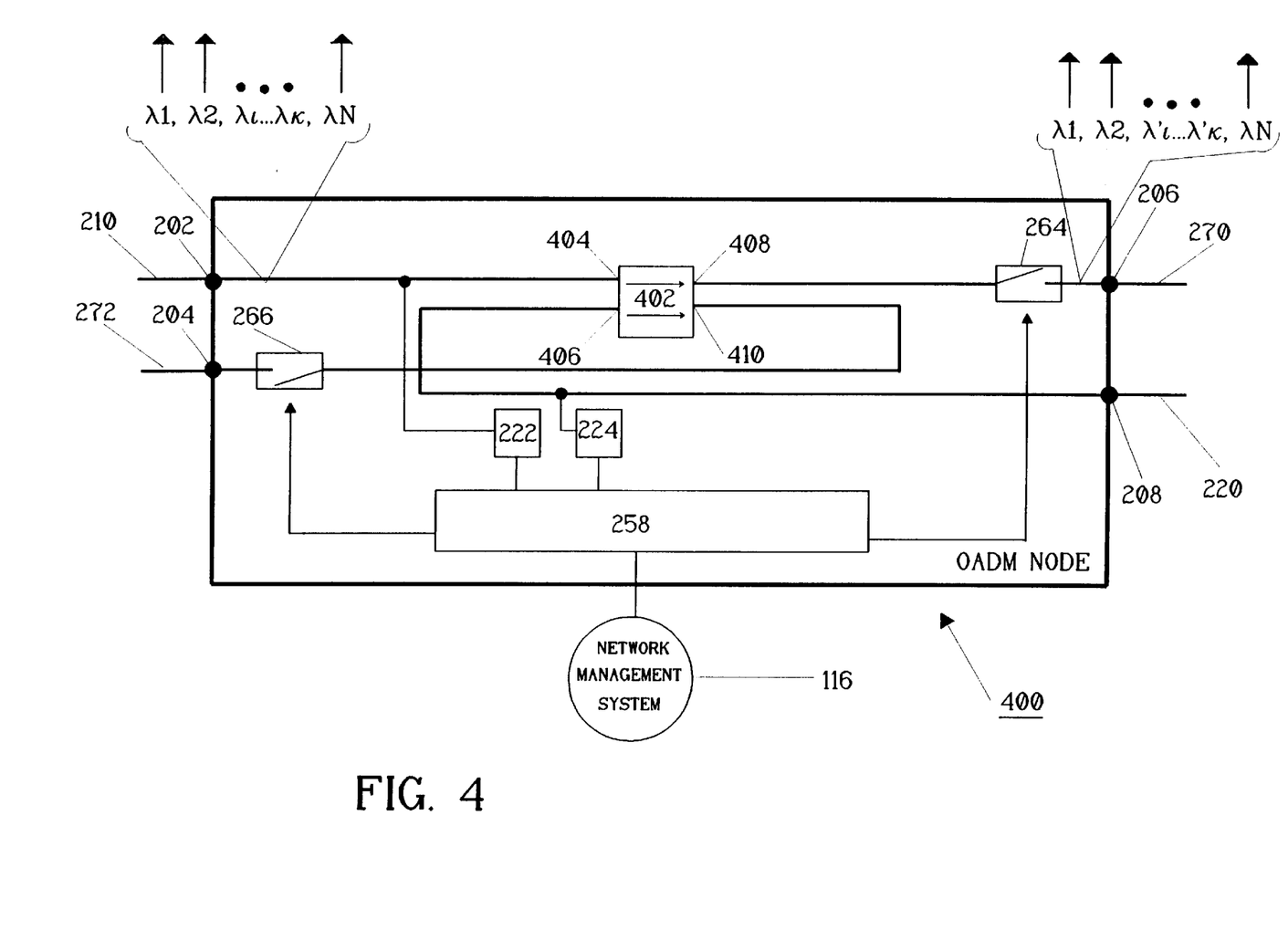
FIG. 4 shows a modified node structure.

FIG. 4 shows a block diagram of an alternative node 400 that can act as head node and/or tail node. The alternative node 400 can be any of the nodes 102–108 in FIG. 1, according to the invention. The alternative node 400 has the working ring input 202, which is connected to the first light propagating means 210, e.g. an optical fiber. The working ring input 202 is connected to a first optical input 404 of an optical switch or optical switching means 402, which can be switched for working in, e.g; bar state, first cross state and/or second cross states. The second light propagation means 220, which also could be an optical fiber, is connected to the protection ring input 208 of the node 400. This protection ring input 208 is connected to a second optical input 406 of the optical switch 402. A first optical output 408 of the optical switch 402, which in bar state is coupled to the first optical input 404, is connected to the first optical breaking switch 264. The third light propagating means 270 is connected to the working ring output 206, which is connected to the first optical breaking switch 264. A second optical output 410 of the optical switch 402, which in bar state is coupled to the second optical input 406, is connected the second optical breaking switch 266. The fourth light propagating means 272 is connected to the protection ring output 204 which is connected to the second optical breaking switch 266. The first fault monitor 222 is optically connected to the first input 404 of the optical switch 402. The second fault monitor 224 is optically coupled to the second input 406 of the optical switch 402. The fault monitors 222, 224 and the optical switch 402 are electrically connected to the control means or local control unit 258, which controls the first and second breaking switches 264 and 266. The local control unit 258 is connected to the network management means or the network management system 116, which is located outside the node. The network management system 116 is connected correspondingly to other nodes as well.

When the alternative node 400 is in working state, as shown in FIG. 1a, the number of M wavelength channels come into the node 400 from the working ring input 202, and they pass through the optical switch 402 which is in bar state. The local control unit 258 controls the optical switch 402, and communicates with the network management system 116 via a standard interface. As shown in FIG. 4, the first light propagation means 210, and the working ring input 202 is connected to the third light propagation means 270 via the optical switch 402 in bar state, the first breaking switch 264, the working ring output 206, and forms part of the working ring 112, FIG. 1a. As is also shown in FIG. 4 the second light propagation means 220 and connected to protection ring input 208 connected to second light propagation means 220 via the optical switch 402 in bar state, the second breaking switch 266, the protection ring output 204, forming part of the protection ring 114 as shown in FIG. 1a.

The alternative node 400 can operate either as working node described above, as the head node, as the tail node or as transit node.

In order to discover an error, e.g. break, in the first transmission link or working ring, the node 400 in FIG. 4 is equipped with the first fault monitor 222. The monitor 222 taps a small amount of the optical power from the working ring input 202. This could be the wavelength channels and/or ASE power. The local control unit 258 gets information from the first fault monitor 222, and if there is any optical power the fault monitor 222 stays in its working state. If the working ring 112 has failed the fault monitor 222 changes over to protection state. The ASE power can still be present in the protection ring 114. Any detection of the traffic loss by the first fault monitor 222 initiates reconfiguration of the node 400 by the local control unit 258. The first fault monitor 222 or the local control unit 258 is put in protection state. After fault detection the local control unit 258 switches the optical switch 402 to the first cross state. The first cross state means that second input 406 of the optical switch 402 and the first output 408 of the optical switch 402 are connected to each other. This means that the ASE power and/or traffic on the protection ring 114 is folded over to the working ring 112. The local control unit 258 will also open the second breaking switch 266 so that neither any traffic nor any ASE power can go to the protection ring output 204 after change-over. The node 400 has now entered a head node. The local control unit 258 communicates with the network management system 116 and informs that the node 104 has become the head node.

Recovery process of the head node is done the same way as described before. The difference is that the optical switch 402 will return to the bar state which means that the first optical input 404 of the optical switch 402 is coupled to the first optical output 408 of the optical switch 402.

In order to discover an error, e.g. break of the second transmission link or protection ring, the node 400 in FIG. 4 is equipped with the second fault monitor 224. The monitor 224 taps a small amount of the optical power from the protection ring input 208. This could be the ASE power and/or the wavelength channels. The local control unit 258 gets information from the second fault monitor 224, and if there is any optical power the fault monitor 224 stays in its working state. If the protection ring 114, has failed the fault monitor 224 changes over to protection state. The ASE power can still be present in the working ring 112. Any detection of the loss of traffic by the second fault monitor 224 initiates reconfiguration of the node 400 by the local control unit 258. The second fault monitor 224 or the local control unit 258 is put in protection state. After fault detection the local control unit 258 switches the optical switch 402 to the second cross state. The second cross state means that first input 404 of the optical switch 402 and the second output 410 of the optical switch 402 are connected to each other. This means that the traffic on the working ring 112 is folded over to the protection ring 114. The local control unit 258 will also open the first breaking switch 264 so that neither traffic nor ASE power can go to the working ring output 202 after change over. The node 400 will become a tail node. The local control unit 258 communicates with the network management system 116 and informs the network management system 116 that the node 102 has become tail node.

Recovery process of the head node is done the same way as described before. The only difference is that the optical switch 402 will return to the bar state which means that the second optical input 406 of the optical switch 402 is coupled to the second optical output 410 of the optical switch 402.

The node 400 can work as head and tail nodes at the same time. The difference from above description is that the first and second breaking switches 264 and 266 are not open when node 400 is becoming the head and tail nodes. Traffic from head node is not in conflict with the traffic from the tail node due to the optical switch 402 that separates the different traffic directions from each other.

Figure 5A:
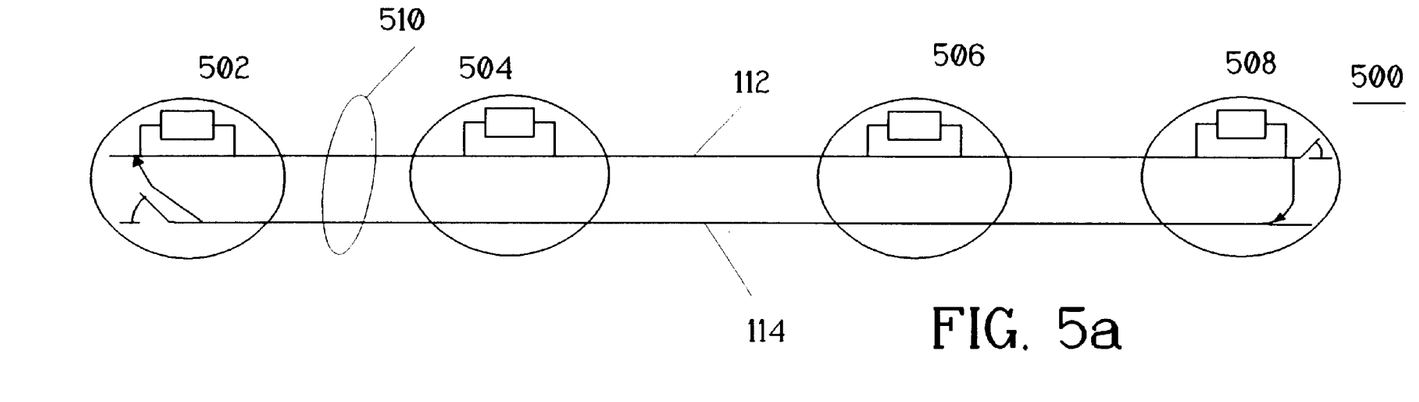
FIG. 5a shows a bus communication network system.

FIG. 5a shows a schematic view of an alternative communication network, a bus communication network 500 embodying the present invention. The bus communication network 500 has the number of N nodes 502–508 connected to each other by bus transmission links, e.g. bus optical links 510. At one end there is a first node or a start node 502, which maybe designed like the nodes 200 or 400, and at the opposite end there is the Nth or an end node 508 which maybe designed like the node 200 or 400. The bus transmission links 510 comprise a first bus transmission link or working link 512 and a second bus transmission link or protection link 514. At the start node 502 the working link 512 is in contact with the protection link 514, and the node 502 acts as the tail node, see first fault event. At the end node 508 the protection link 514 is in contact with the working link 512 and the node 508 acts as the head node, see first fault event. The bus communication network 500 is formed by the first node 502, the end node 508, the working link 512, and the protection link 514 together. The bus network 500 is transmitting the wavelength channels in one direction through the working link 512 and in the opposite direction through the protection link 514. FIG. 5a also shows the bus communication network 500 in its working state, which means those N wavelength channels together with a ASE power travelling in one direction through the working link 512 onto the protection link 514. This bus communication network 500 could also be a wavelength division multiplexed self-healing bus communication network. Other types of bus communication networks that are not shown here could be used as the bus communication network. Each node in the bus communication network 500 can consist of an optical add/drop multiplexer, which is able to add/drop wavelength channels of traffic dedicated to the node, i.e. local traffic, and by-pass others. Other nodes, such as in FIG. 4 can be used as head node, tail node or transit nodes. The bus communication network 500 is working as previously described.

Figure 5B:
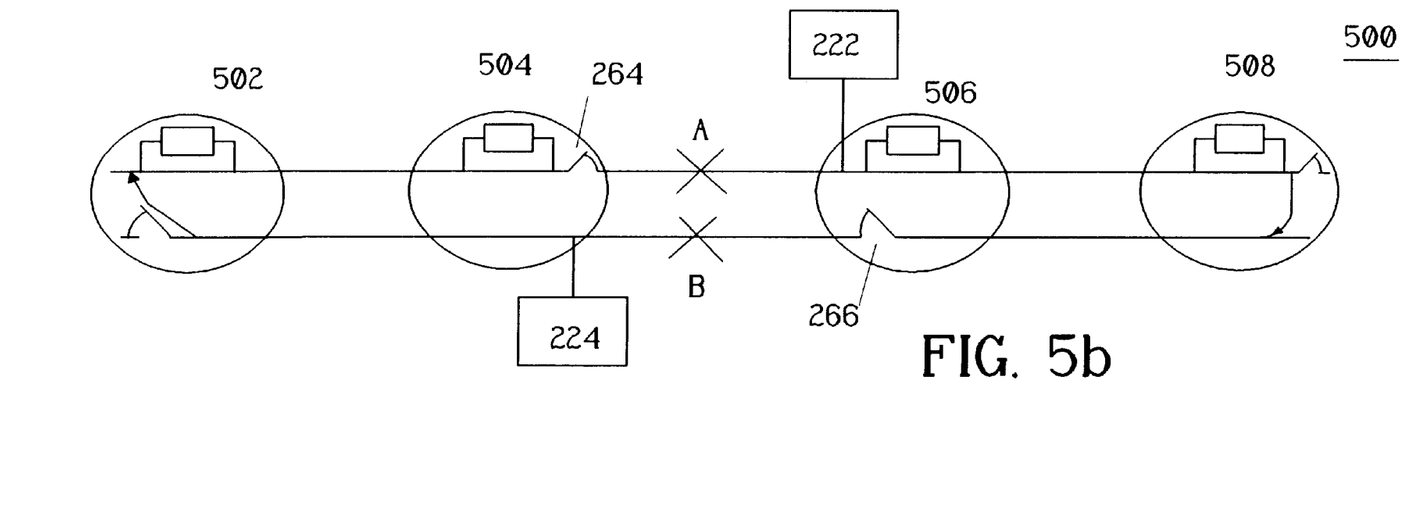
FIG. 5b shows a bus communication network system with links cut.

FIG. 5b shows examples of two places A and B where link failures, e.g. cable cuts could occur. The cable cut could be anywhere on the bus communication network. Each node after a cable cut will act as a head node and each node before a cable cut will act as a tail node, as previously described in connection with FIG. 2 and FIG. 4.

Figure 6:
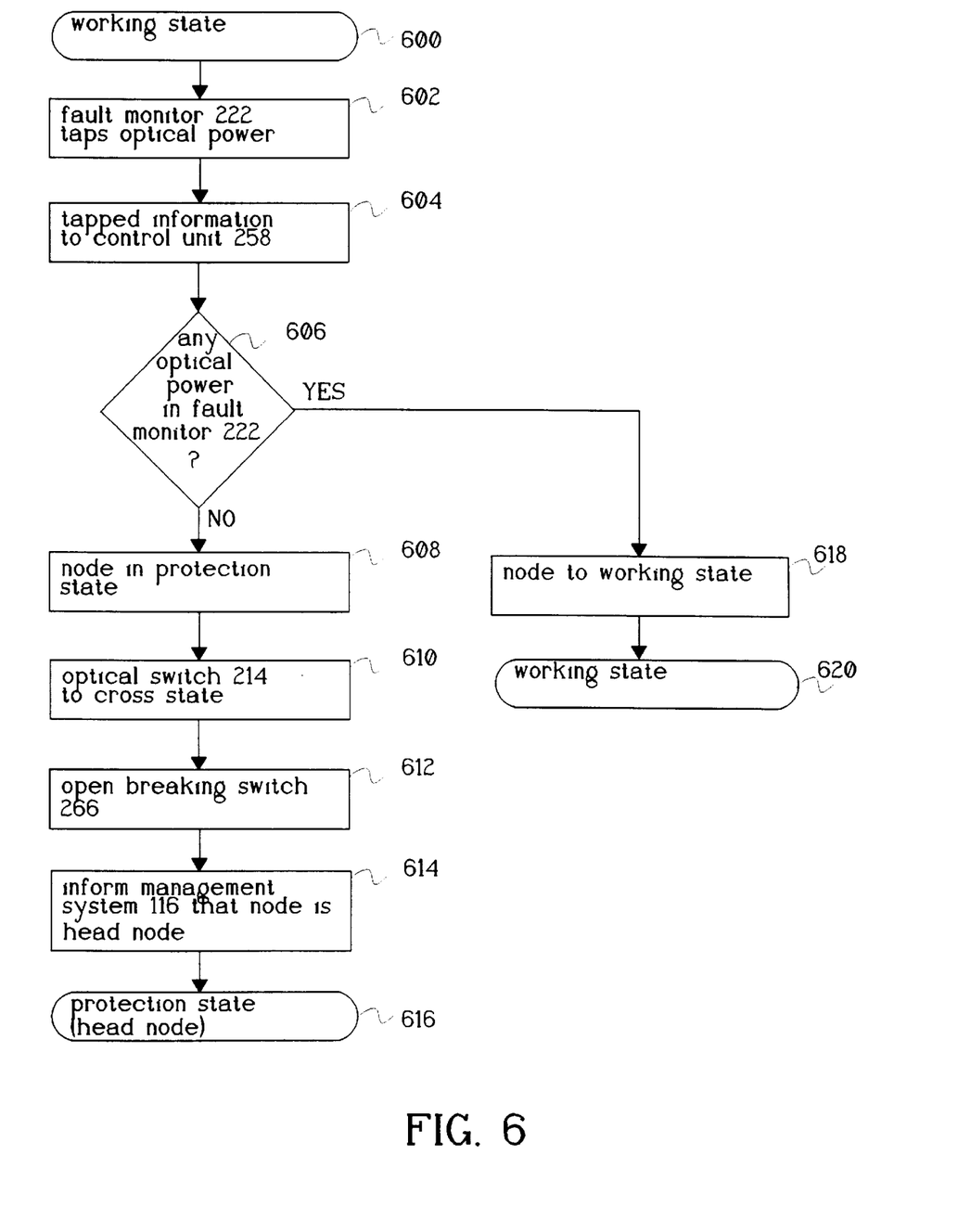
FIG. 6 shows a flow chart over a method for a node in working state to become head node.

FIG. 6 shows the method for a node to become the head node 104, FIG. 1b, which is described earlier in this section. The main steps are as follows:

working state, block 600 fault monitor 222 taps optical power, block 602 tapped information to control unit 258, block 604 any optical power in fault monitor 222 ?, block 606

If no on question at block 606, the following main steps are taken:

node to protection state, block 608 optical switch 214 to cross state, block 610 open breaking switch 266, block 612 inform management system 116 that node is head node, block 614 protection state (head node), block 616.

If yes on question at block 606, the following main step is taken:

working state, block 620

Figure 7:
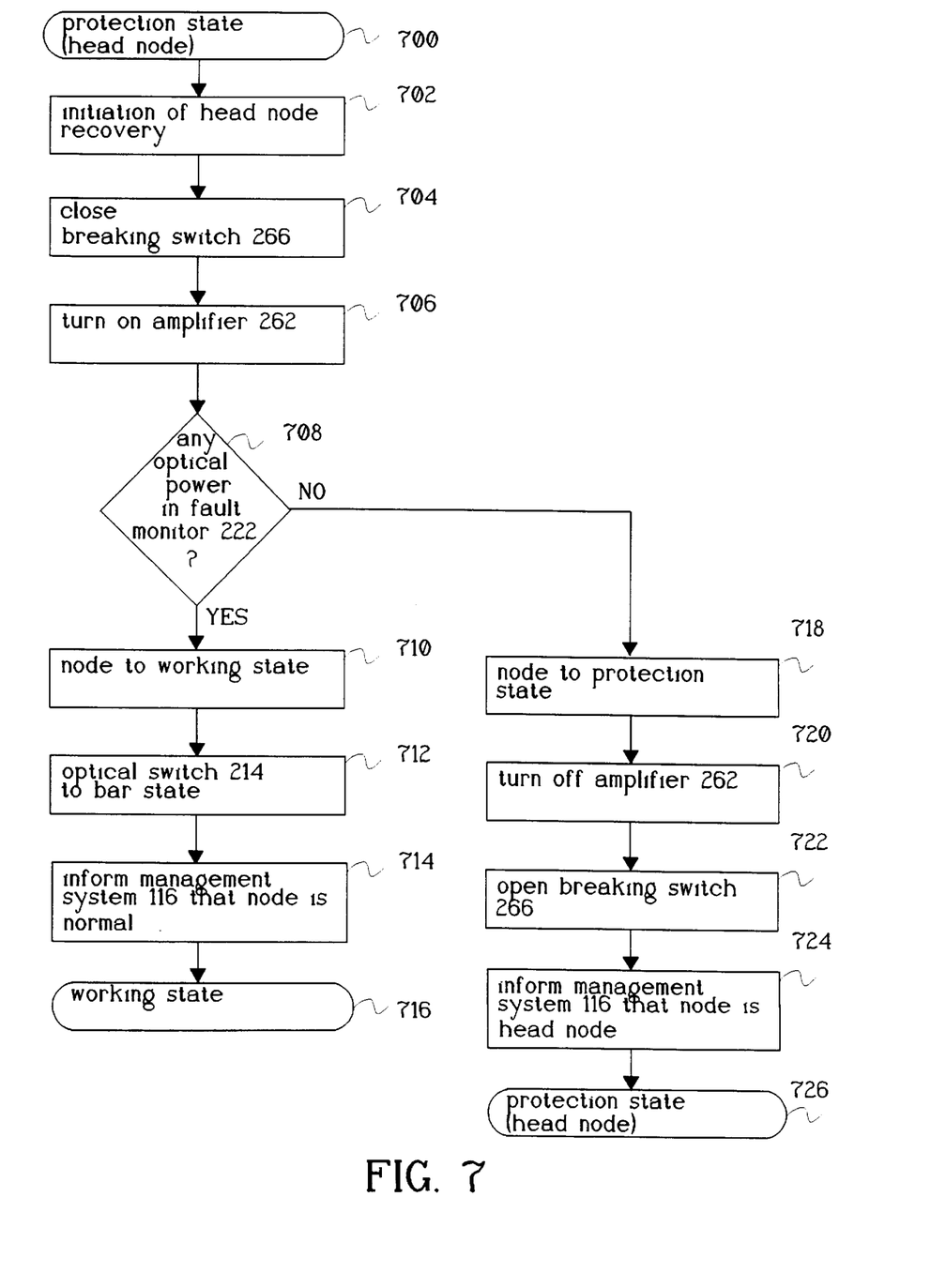
FIG. 7 shows a flow chart over a method for a node in protection state to become normal node.

FIG. 7 shows the method for a node in protection state how to become normal node. This is earlier described in this section.

The main steps are as follows:

protection state (head node), block 700 initiation of head node recovery, block 702 close breaking switch 266, block 704 turn on amplifier 262, block 706 any optical power in fault monitor 222 ?, block 708

If yes on question at block 708, the following main steps are taken:

node to working state, block 710 optical switch 214 to bar state, block 712 inform management system 116 that node is normal, block 714 working state, block 716

If no on question at block 708, the following main steps are taken:

turn off amplifier 262, block 720 open breaking switch 266, lock 722 inform management system 116 that node is head node, block 724 protection state (head node), block 726

Figure 8:
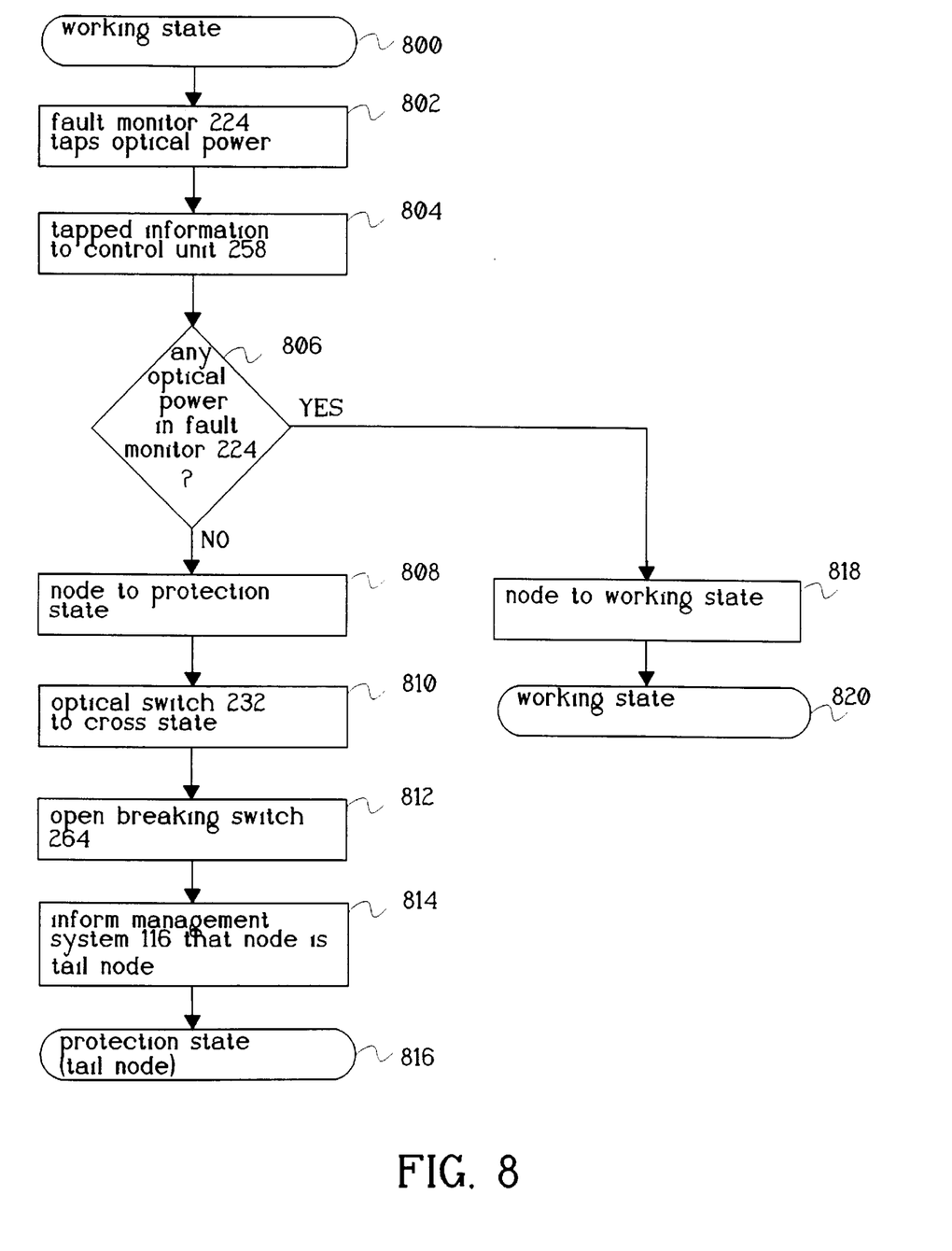
FIG. 8 shows a flow chart over a method for a node in working state to become tail node.

FIG. 8 shows the method for a node to become the tail node, FIG. 1b. This is earlier described in this section. The main steps are as follows:

working state, block 800 fault monitor 224 taps optical power, block 802 tapped information to control unit 258, block 804 any optical power in fault monitor 224 ?, block 806

If no on question at block 806, the following main steps are taken:

node to protection state, block 808 optical switch 232 to cross state, block 810 open breaking switch 264, block 812 inform management system 116 that node is tail node, block 814 protection state (tail node), block 816.

If yes on question at block 806 the following main step is taken:

working state, block 820

Figure 9:
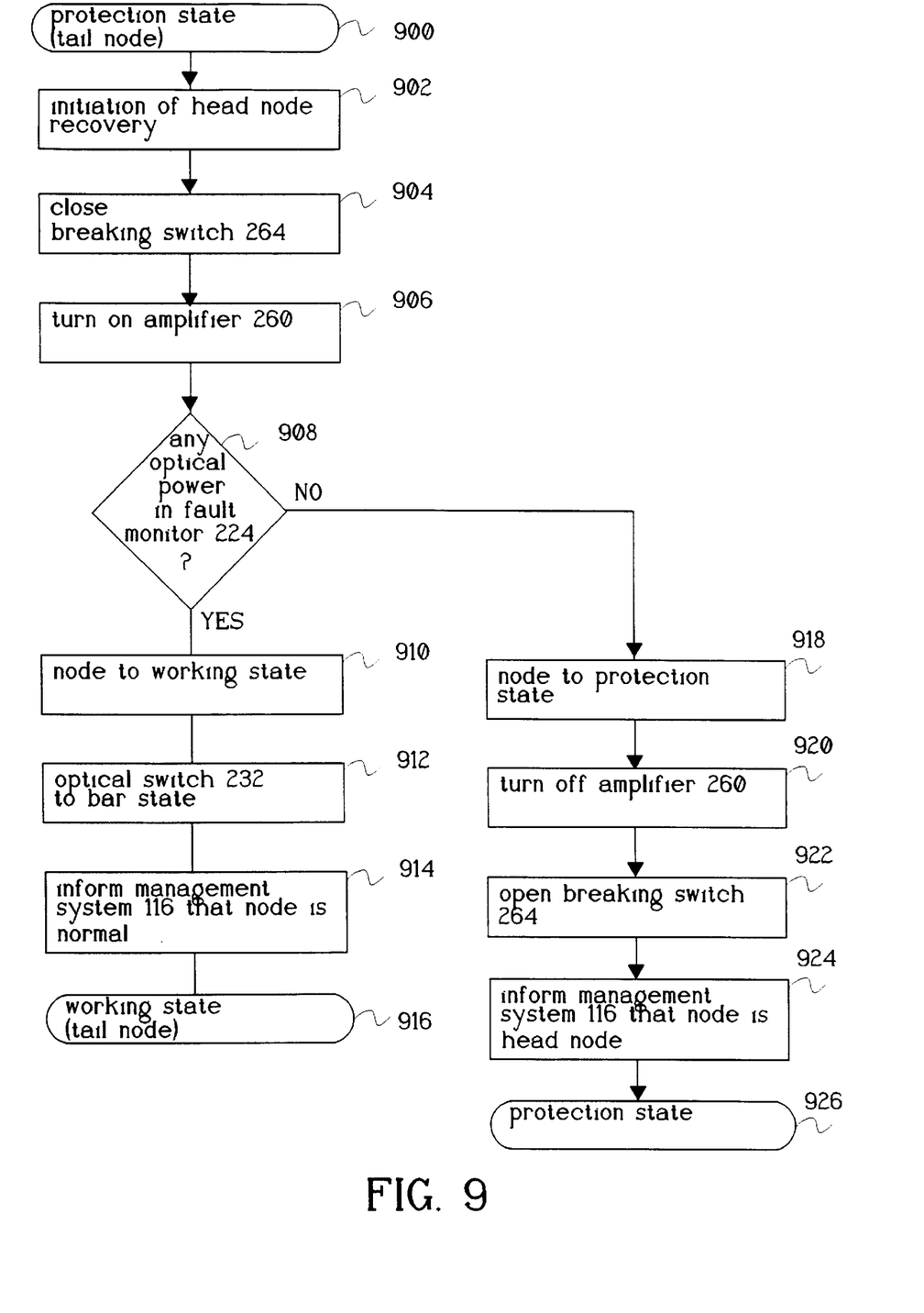
FIG. 9 shows a flow chart over a method for a node in protection state to become normal node.

FIG. 9 shows a method for the node in protection state how to become normal node. This is earlier described in this section.

The main steps are as follows:

protection state (tail node), block 900 initiation of tail node recovery, block 902 close breaking switch 264, block 904 turn on amplifier 260, block 906 any optical power in fault monitor 224 ?, block 908

If no on question at block 908, the following main steps are taken:

node to working state, block 910 optical switch 232 to bar state, block 912 inform management system 116 that node is normal, block 914 working state, block 916

If yes on question at block 908 the following main steps are taken:

turn off amplifier 260, block 920 open breaking switch 264, block 922 inform management system 116 that node is tail node, block 924 protection state (tail node), block 926

Advantage is that the channel selective switch is not involved in the node reconfiguration process. This means it is not affected by any transient, where by the traffic routing and add/drop functions are stable during the node reconfiguration routine.

The invention described above is described in an optical solution but this is not a necessary requirement.

The invention described above may be embodied in yet other specific forms without departing from the spirit or essential characteristics thereof. Thus, the present embodiments are to be considered in all respects as illustrative and not restrictive, the scope of the invention being indicated by the appended claims rather than by the foregoing descriptions, and all changes which come within the meaning and range of equivalency of the claims are therefore intended to be embraced therein.

We claim:

1. A Communication node for communication with other nodes by receiving optical energy on incoming optical links and transmitting optical energy on outgoing optical links, which node comprises:

first incoming link supervision means for detecting incoming optical energy from a first incoming optical link;

second incoming link supervision means for detecting incoming optical energy from a second incoming optical link;

optical switching means for switching incoming optical energy from the first or the second optical incoming link to the first or second optical outgoing link;

control means connected to the supervision means and switching means for controlling whether the node is in a normal mode, a head mode or a tail mode of operation in response to the detection of incoming optical energy on one or both of the incoming optical links; and recovery means for testing to determine if it is possible to recover from the head or tail mode to the normal mode.

2. A communication node according to claim 1, wherein the recovery means comprise breaking switches adapted to create a separate test loop for the recovery testing, and wherein the control means is adapted to control the node from head or tail mode into normal mode, whereby the node is adapted to forward optical energy from the first incoming link to the first outgoing link and optical energy from the second incoming link to the second outgoing link.

3. A communication node according to claim 1, wherein the control means is adapted to control the node into a tail mode when the link supervision means detect incoming energy from the first, but not the second incoming links, whereby the node is adapted to forward optical energy from the first incoming link to the second outgoing link, but not to the first outgoing link.

4. A communication node according to claim 1 wherein the control means is adapted to control the node into a head mode when the link supervision means detect incoming energy from the second but not the first incoming links, whereby the node is adapted to forward optical energy from the second incoming link to the first outgoing link, but not to the second outgoing link.

5. A node according to claim 1 wherein:
   the first incoming and outgoing links are connected to separate other nodes to constitute part of a first transmission link of a communication ring network; and
   the second incoming and outgoing links are connected to separate nodes to constitute part of a second transmission link of the communication ring network.

6. A conmmunication network comprising at least three nodes which are interconnected by transmission links carrying wavelength channels to and from the nodes, the transmission links being divided into a first transmission link and a second transmission link, the nodes having a working ring input and a working ring output for the first transmission link, and also having a protection ring input and a protection ring output for the second transmission link, where the first and second transmission link can transmit the wavelength channels in opposite directions, each of the nodes comprising:
   means for fault monitoring by detecting optical power, said means being connected to the working ring input and the protection ring input;
   means for switching over the wavelength channels from the first transmission link to the second transmission link; local control unit, being connected to the means for fault monitoring and also connected to the means for switching over the wavelength channels; and
   recovery means for testing to determine if it is possible to recover from a protection mode to a working mode.

7. A node according to claim 6, wherein the recovery means comprise breaking switches adapted to create a separate test loop for recovery testing.

8. A node in a communication network which node is interconnected to other nodes by transmission links carrying wavelength channels to and from the nodes, the transmission links being divided into a first transmission link and a second transmission link, the nodes having a working ring input and a working ring output for the first transmission link, and also having a protection ring input and a protection ring output for the second transmission link, where the first and second transmission link can transmit the wavelength channels in opposite directions, each of the nodes comprising:
   means for fault monitoring by detecting optical energy, said means being connected to the working ring input and the protection ring input;
   means for switching over the wavelength channels from the first transmission link to the second transmission link;
   local control unit, being connected to the means for fault monitoring and also connected to the means for switching over the wavelength channels; and
   recovery means for testing to determine if it is possible to recover from a protection mode.

9. A node according to claim 8, wherein the recovery means comprise breaking switches adapted to create a separate test loop for the recovery testing.

10. An optical node for communication with other optical nodes by receiving and transmitting channels via light propagation means, which node comprising:
   an optical switch comprising a first and a second input, and a first and a second output, said switch being switchable between a bar state, wherein the first input and output are connected and wherein the second input and output are connected and a cross state, wherein the first input and the second output are connected and wherein the second input and the first output are connected;
   a first fault monitor provided for detection of optical energy, said fault monitor being optically coupled to the first input of the optical switch;
   a second fault monitor provided for detection of optical energy, said fault monitor being optically coupled to the second input of the optical switch;
   a first optical breaking switch being connected to the first optical output of the optical switch;
   a second optical breaking switch being connected to the second optical output of the optical switch;
   a working ring input being connected to a first light propagating means and the first optical input of the optical switch;
   a protection ring input being connected to a second light propagation means and the second optical input of the optical switch;
   a working ring output being connected to the first optical breaking switch and a third light propagating means;
   a protection ring output being connected to the second optical breaking switch and a fourth light propagating means.

11. An optical add/drop multiplexer node for communication with other optical nodes by receiving and transmitting channels via light propagation means, which node comprising:
   a first optical switch comprising a first and a second input, and a first and a second output, said switch being switchable between a bar state, wherein the first input and output are connected and wherein the second input and output are connected and a cross state, wherein the first input and the second output are connected and wherein the second input and the first output are connected;
   a second optical switch comprising a first and a second input, and a first and a second output, said second input being connected to the second output of the first optical switch, said switch being switchable between a bar state, wherein the first input and output are connected and wherein the second input and output are connected and a cross state, wherein the first input and the second output are connected and wherein the second input and the first output are connected;
   a wavelength selective switch, comprising a first and a second input, and a first and a second output, said first input being connected to the first output of the first optical switch, said second output being connected to the first input of the second optical switch, said channel selective switch being switchable between a bar state, wherein the first input and output are connected and wherein the second input and output are connected and a cross state, wherein the first input and the second output are connected;

a line terminal, comprising an input connected to the first output of the wavelength selective switch and comprising an output connected to the second input of the wavelength selective switch;

a first optical amplifier connected to the first output of the second optical switch;

a second optical amplifier connected to the second output of the second optical switch;

a first optical breaking switch connected to the first optical amplifier;

a second optical breaking switch connected to the second optical amplifier;

a working ring input being connected to the first optical breaking switch and a first light propagating means;

a protection ring input being connected to the first input of the first optical switch and a second light propagation means;

a working ring output being connected to the first optical breaking switch and to a third light propagation means;

a protection ring output being connected to the second optical breaking switch and a fourth light propagating means;

a first fault monitor provided for detection of optical energy, said means being optically connected to the first input of the first optical switch;

a second fault monitor provided for detection of optical energy, said means being optically connected to the second input of the first optical switch and a local control unit being connected to a network management system said local control unit controlling; the first and second optical switches, the wavelength selective switch and the first and second breaking switches.

12. A method for restoring a communication network of at least three nodes, the nodes being interconnected by transmission links, each node comprising a working ring input and a working ring output connected to a first transmission link, and further comprising a protection ring input and a protection ring output connected to a second transmission link, where the first and the second transmission link can transmit signals in opposite directions, the method comprising the following steps:

transmitting signals on the first transmission link, wherein all nodes in the system are in a working mode;

detecting a fault by loss of incoming optical power, wherein some nodes switch to a protection modes and changing the states of optical switching means, so that a transmission loop is created using both transmission links, said transmission loop not passing the fault;

repairing the fault;

initiating a recovery test by creating a test loop passing the presumably repaired fault, said test loop being separate from the transmission loop;

leaving the nodes in the protection mode when detecting no optical power in the test loop;

switching the nodes to the working mode when detecting optical power in the test loop, and changing the state of the optical switching means, so that signals are once again transmitted on the first transmission link;

informing management system about node status.

13. A method according to claim 12, wherein the test loop is being created by closing breaking switches, which breaking switches are otherwise open during protection mode.

14. A method for recovering from a fault in a communication network that comprises at least three nodes that are interconnected by a first transmission link and a second transmission link, said method comprising the steps of:

detecting a fault in one or both of said first and second transmission links between a first of said at least three nodes and a second of said at least three nodes; and connecting, in each of said first and second nodes, said first transmission link to said second transmission link, said first transmission link routes traffic in an opposite direction to said second transmission links;

detecting, after said fault has been detected, when said fault has been corrected; and disconnecting, in each of said first and second nodes, said first transmission link and said second transmission link, wherein said communication network continues uninterrupted operation despite the detection of the fault.

15. The method of claim 14 wherein said fault is detected by each of said first and second nodes.

16. A method for recovering from a fault in a communication network that comprises at least three nodes that are interconnected by a first transmission link and a second transmission link, said method comprising the steps of:

detecting a fault in one of said first and second transmission links between a first of said at least three nodes and a second of said at least three nodes;

switching said first and second nodes from a normal working mode into a protective mode, where said first and second nodes route signals received on said first transmission link to said second transmission link and signals received on said second transmission link to said first transmission link when in said protective mode, and route signals received on said first transmission link to said first transmission link and signals received on said second transmission link to said second transmission link in said normal mode;

creating a test loop;

detecting, via said test loop, if said fault has been corrected;

switching, in response to detecting that said fault has been corrected, said first and second nodes from said protective mode to said normal working mode.

17. The method of claim 16 wherein said steps of detecting and said steps of switching are performed independently by said first and second nodes.

18. A method for recovering from a fault in a communication network that comprises at least three nodes that are interconnected by a first transmission link and a second transmission link, said method comprising the steps of:

detecting a fault in one or both of said first and second transmission links between a first of said at least three nodes and a second of said at least three nodes; and connecting, in each of said first and second nodes, said first transmission link to said second transmission link, said first transmission link routes traffic in an opposite direction to said second transmission link;

creating a test loop that includes a portion of the first or second transmission link that contains the fault;

detecting, via said test loop, whether said fault has been repaired; and disconnecting, in said first and second nodes, said first and second transmission links in response to the detection that the fault has been repaired, wherein said communication network continues uninterrupted operation despite the detection of the fault.

* * * * *